United States Patent Office 3,578,585
Patented May 11, 1971

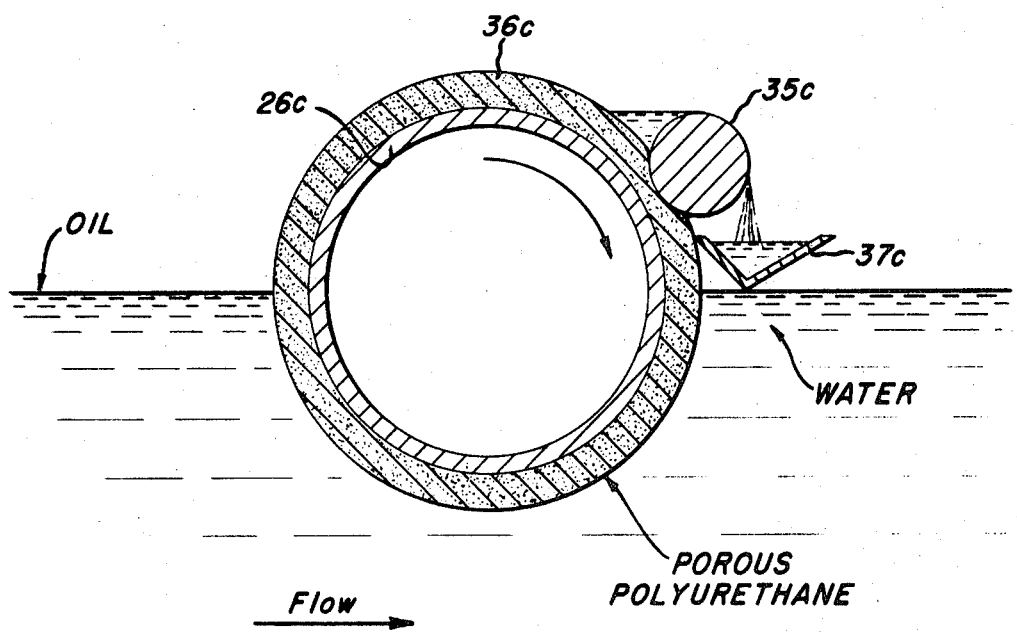

3,578,585
METHOD OF REMOVING FLOATING OIL FROM THE SURFACE OF A BODY OF WATER
Robert L. Yahnke, Munster, Ind., assignor to Standard Oil Company, Chicago, Ill.
Continuation of application Ser. No. 672,294, Oct. 2, 1967. This application Mar. 24, 1969, Ser. No. 809,524
Int. Cl. B01d 15/02, 33/02
U.S. Cl. 210—30
4 Claims

ABSTRACT OF THE DISCLOSURE

A rotating cylinder covered with a layer of porous polyurethane absorbs oil flowing on a body of water, and a roller squeezes absorbed oil from the layer into a collecting trough.

CROSS-REFERENCE TO RELATED APPLICATION

The application is a continuation of my copending application, Ser. No. 672,294, filed Oct. 2, 1967, now Pat. No. 3,487,927, issued Jan. 6, 1970.

BACKGROUND OF THE INVENTION

The present invention concerns method for separating liquid hydrocarbon compounds from water and other immiscible liquids. Specifically, this invention concerns the separation of oil and oil-base compounds from the surface of bodies of water and the removal of droplets of oil dispersed throughout a body of water.

The conservation of environmental resources on a world-wide basis has over the past two decades become a greater and greater problem. The conservation of water as one of our most important environmental resources presents a major problem today. One facet of this problem concerns the removal of hydrocarbons from bodies of water in the continuing attempt to combat stream, lake, and sea coast pollution irrespective of the myriad of sources of the hydrocarbon pollutant.

Many mechanical separating devices and methods have been devised as exemplified by the art to perform some degree of water/oil separation. For example, floating booms for capturing and collecting spill for maintenance within a confined area has long been known and practiced; however, there remains the problem of separation of the water and oil. Barges having various types of skimming devices mounted thereon to skim the surface of the water in contact with the lower surface of the spill layer have long been known and used to a limited extent despite the obvious inherent problems. Other devices depend upon the differential gravity of water and oil to accomplish the separation with the attendant problems including sudden changes in the level of water and/or oil which results in poor separation. There is always the problem of capturing large amounts of water with the recovered oil which requires additional work and expense to handle and separate. Generally, the known water/oil separation devices have the implicit limitation that a pool of oil must exist on the surface of the water in a nondispersed manner to obtain a useful oil recovery.

Other methods include the utilization of polymeric films to provide a mop effect by means of the surface attraction between the film and the oil. Also, sinking of the oil by spreading carbonized sand provides a temporary antipollution measure as does the application of an emulsifier such as a detergent to the surface of the water body supporting a pool of oil.

DESCRIPTION OF THE APPARATUS USED IN THE INVENTION

The apparatus for removing oil which is floating on the surface of a body of water, and the central feature of my apparatus is a rotating cylinder having a porous outer layer made of polyurethane. This rotating cylinder is partially submerged in said body of water so that as it rotates, the polyurethane layer absorbs oil floating on the water's surface. Roller means above the water's surface engage the periphery of the cylinder and apply pressure against the polyurethane layer to remove absorbed oil. To collect this removed oil, collecting means, for example a trough, is disposed adjacent the cylinder's periphery and between the roller means and water's surface. Thus, as the roller means squeeze absorbed oil from the polyurethane layer, the collecting means catch it before it falls into the water.

DESCRIPTION OF THE DRAWING

The figure depicts the regenerable absorption filter means 36c covering the moving means which includes the cylinder 26c. The regenerating means includes roller 35c and trough 37c, the former is in contact with the filter means 36c and the latter is located below and adjacent roller 35c.

DESCRIPTION OF THE PREFERRED EMBODIMENT

The embodiment portrayed in the figure utilizes a regenerable absorption filter means 36c which forms a sheath or cover about the moving mass comprising the closed cylinder 26c. The regenerating means including roller 35c and the lower adjacent trough 37c function as a wringer to remove oil, some water and other impurities from the filter means for collection and transportation from the system by tough 37c. The moving means is a closed rotatable cylinder 26c having the filter means 36c forming a sheath about the cylinder wall. As the moving means rotates, the filter means passes through the oily water flowing in the direction shown. The oil preferentially wetting the surfaces of the interstices of the filter means 36c is carried along with some water to the regenerating means where the water, oil and other impurities are removed from the filter means and the system by the regenerating means 35c and 37c. Means 36c is polyurethane.

I claim:

1. A method for removing oil which is floating on the surface of a body of water, comprising the steps of:
   partially submerging in the body of water a cylinder having mounted thereon a porous and substantially continuous outer layer of polyurethane which abuts the curved surface of the cylinder, enabling said surface to provide substantially continuous support for said layer;
   rotating the cylinder in the water whereby successive portions of the periphery of the porous outer layer contact and selectively absorb the oil while supported by said curved surface;
   compressing the porous outer layer between the curved surface of the cylinder and roller means which engage, above the surface of the body of water, the periphery of the porous outer layer, whereby the absorbed oil is expelled and flows downwardly toward the body of water; and
   collecting the expelled oil in a collecting means disposed adjacent the external periphery of the porous outer layer and between the roller means and the body of water.

2. The method of claim 1 wherein the oil is flowing in a predetermined direction and the cylinder is rotating against the flow.

3. The method of claim 1 wherein the porous outer layer of the cylinder is foamed polyurethane.

4. The method of claim 1 wherein the oil is discharged, immediately after its expulsion from the porous outer layer, into a space between the periphery of the porous outer layer and roller means thereby displacing expelled oil from the surface of the oil in the space causing it to flow over the roller means and then downwardly toward the body of water.

References Cited

UNITED STATES PATENTS

| 1,860,819 | 5/1932 | Schambeger | 210—523 |
| 2,860,973 | 11/1958 | Wells | 210—65X |
| 3,426,902 | 2/1969 | Kilpert et al. | 210—402 |

FOREIGN PATENTS

| 1,026,201 | 4/1966 | Great Britain | 210—40 |

SAMIH N. ZAHARNA, Primary Examiner

U.S. Cl. X.R.

210—40, 170, 402